United States Patent

Noé

[11] 4,053,870
[45] Oct. 11, 1977

[54] DIGITAL SIGNAL LEVEL COMPARISON DEVICE

[75] Inventor: Werner Noé, Planegg, Germany

[73] Assignee: Siemens Aktiengesellschaft, Munich, Germany

[21] Appl. No.: 607,590

[22] Filed: Aug. 25, 1975

[30] Foreign Application Priority Data

Aug. 23, 1974 Germany .............................. 2440604

[51] Int. Cl.² .......................... G06F 7/02; H01P 1/22
[52] U.S. Cl. .............................. 340/146.2; 179/1 HF; 333/81 R; 340/347 DD
[58] Field of Search ..................... 235/177; 179/1 HF; 323/16–18; 340/347 DA, 347 DD, 146.2; 328/14; 333/14, 17, 24, 81 R

[56] References Cited

U.S. PATENT DOCUMENTS

| | | | |
|---|---|---|---|
| 3,146,313 | 8/1964 | Ulin | 179/1 HF |
| 3,308,286 | 3/1967 | Norman et al. | 235/177 |
| 3,346,844 | 10/1967 | Scott et al. | 235/177 |
| 3,510,682 | 5/1970 | Nichols | 340/347 DA |
| 3,577,084 | 5/1971 | Atcherson et al. | 340/347 DA |
| 3,632,996 | 1/1972 | Paine | 340/347 DA |
| 3,735,264 | 5/1973 | Mauduech | 340/347 DA |

Primary Examiner—Malcolm A. Morrison
Assistant Examiner—Errol A. Krass
Attorney, Agent, or Firm—Schuyler, Birch, Swindler, McKie & Beckett

[57] ABSTRACT

A digital level comparison device having a digitally controlled switching network for adding or removing attenuation from a signal channel is described. The device includes a binary counter having an input for pulses corresponding to the received signal level and a timing input for receiving clock pulses corresponding to a predetermined nominal level. The counter is graduated in stages, each of which has an output leading to the aforementioned switching network. Within each stage interval, on one side thereof, there is a first additional interval, and on the other side of that stage interval there is a second additional interval. If the counter reading falls within a first additional interval the predetermined nominal level value is reduced by a given value, and if the counter reading falls within a second additional interval the nominal level value is increased by a given value.

3 Claims, 2 Drawing Figures

DIGITAL SIGNAL LEVEL COMPARISON DEVICE

BACKGROUND OF THE INVENTION

This invention relates to the construction of digital signal comparison devices, more particularly to a switching arrangement for such devices for controlling connections and disconnections of attenuator pads thereto. Devices of this nature may be used, for example, in telephone sets having no handsets, i.e., constructed for hands-free operation.

It is known, as illustrated in FIG. 1 to construct digital level comparison devices to have one input for the external level to be measured and another input for the nominal level which is in the form of a clock signal delivered by a clock pulse generator. The level comparison device has a counter range calibrated in equally large intervals. Each of the intervals of the counter range is assigned a special counter output leading to the digital control network which, when the counter reading is in its interval, produces a signal indicating the corresponding condition.

The foregoing circuit arrangement, as stated, is known in the art, more particularly for controlling connections and disconnections of attenuator pads to voice-grade channels, for example, in hands-free telephones. In the level comparison device, the counter range is graduated in separate equally large succeeding intervals, each interval corresponding to a 6 db transmission loss to be inserted. Since each interval of the counter range has an output, the line attenuation is changed by switching on or off a 6 db attenuator stage, when the counter reading is altered more than approximately 3 db, as viewed from the center of the interval. Not until an attenuation variation of about 3 db (calculated from the center of the section) is exceeded will another attenuator stage be switched on or off by a digital control network.

Such a circuit arrangement has a substantial disadvantage. To achieve a permanent loss condition in the voice-grade channels over a comparatively long period, a condition must be created where the measured external level equals the nominal level. As a rule, this can only occur in an analog system, since in this case a continuous change of the inserted channel loss is possible. In a digital system, the insertion will always occur incrementally, and in this way the attenuation in the voice-grade channels will change in fixed specified steps. That means that the exact decrement which would be needed for matching the external level to the nominal level by varying the attenuation can theoretically be adjusted in very specific cases only. In undertaking such adjustment, the attenuation being adjusted will initially be larger than that needed to achieve external levels that are equal to nominal levels. Thus, the next step will be to reduce the attenuation, and as a result the voice-grade channel attenuation is again too low. Hence, it follows that particularly with constant levels (signals on the circuit), an attenuator stage is constantly added to or removed from the circuit, which produces disturbing results in the case of 6 db attenuator stages.

An obvious solution to the foregoing problem consists in making the attenuator stage so small that adding or subtracting stages is no longer felt as disturbing by the human ear. To accomplish this, attenuator stages having values no greater than 2 db should be chosen. However, this would means that with a damping range of, e.g., 48 db, 24 stages would be required. The undesirability of such complexity is obvious. Since the volume range of the human voice has a variation range of about 4 db, such a control device would control over the volume range of the voice. This is absolutely undesirable, however, and for this reason alone this approach does not seem practicable.

An object of the invention is, therefore, to provide a switching arrangement for a level comparison device which regulates at sufficiently large level intervals so as not to have regulation over the volume range of the human voice and which nevertheless, after adjustment to a mean volume level, prevents hunting between two attenuator stages.

SUMMARY OF THE INVENTION

In accordance with the invention, the foregoing and other objects are achieved in that the level comparison device takes the form of a digital counter, and on one side of each interval of the counter range there is disposed a first additional interval that reduces the nominal level by a value $p$ if there is a counter reading there. Similarly, on the other side of each interval of the counter range there is disposed a second additional interval that increases the nominal level by a value $p$ if there is a counter reading there. The aforementioned first and second additional intervals are each coupled to a clock generator via a control lead.

By this means, it is possible to cause the unavoidable hunting for a counter reading in the level comparison device to take place, even when comparatively large attenuator stages are employed, and it has no effect on the voice-grade channels and on the human ear.

BRIEF DESCRIPTION OF THE DRAWINGS

The principles of the invention will be more readily understood by reference to the description of a preferred embodiment given hereinbelow in conjunction with the drawings which are briefly described below.

DETAILED DESCRIPTION OF THE DRAWINGS

Figure 1:
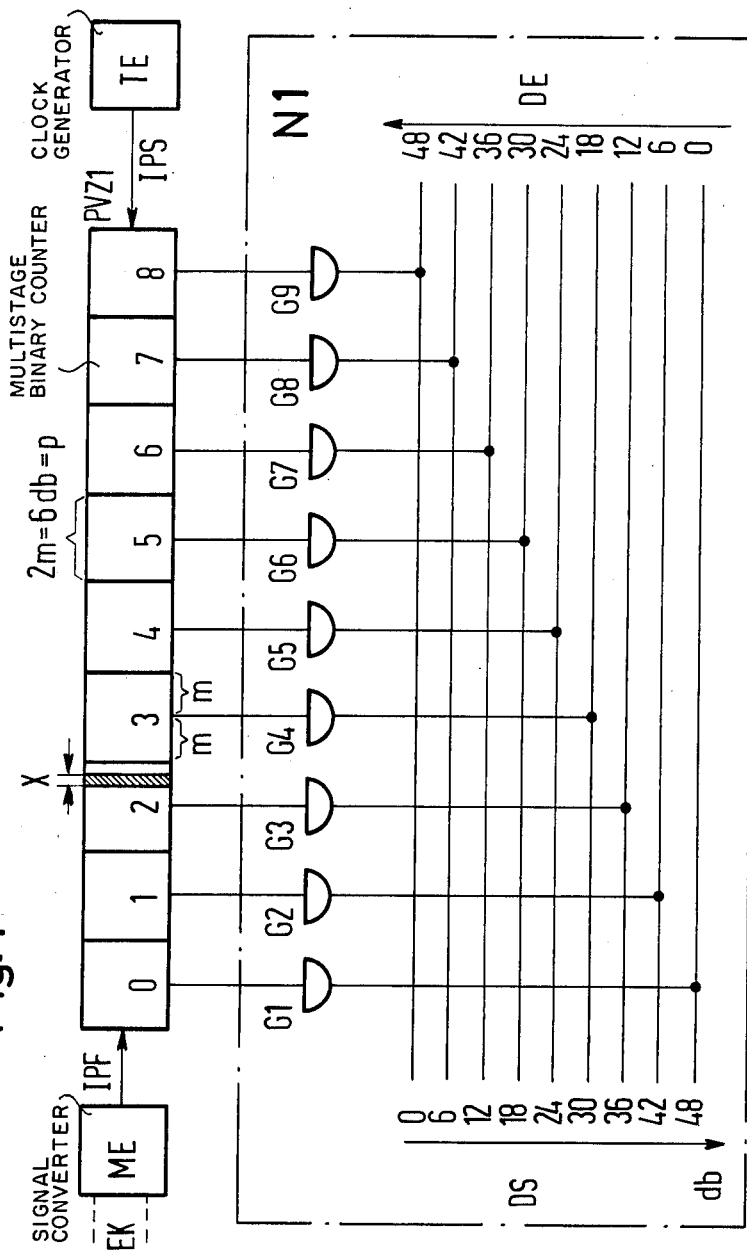
FIG. 1 is a block-schematic diagram of a prior art digital level comparison device.

FIG. 1 is for the purpose of showing the prior art, which comprises essentially a digital level comparison device of known construction (PVZ1) having the graduations 0 to 8 (graduation width = $2m$ = 6 db = $p$) and the counter reading $x$, the digital control network N1 with the gates G1 to G9, appropriate control leads for the control of 9 attenuator stages (0 to 48 db) and one count each for the attenuator DS in the send channel and DE in the receive channel.

FIG. 1 also shows an apparatus ME (which samples and converts the volume level logarithmically in the receiving channel EK and delivers the same in the form of pulse number modulation signals as external level pulses IPF to the level comparison meter) and a clock generator TE (which delivers to the level comparison meter pulses IPS representing a nominal level.)

Figure 2:
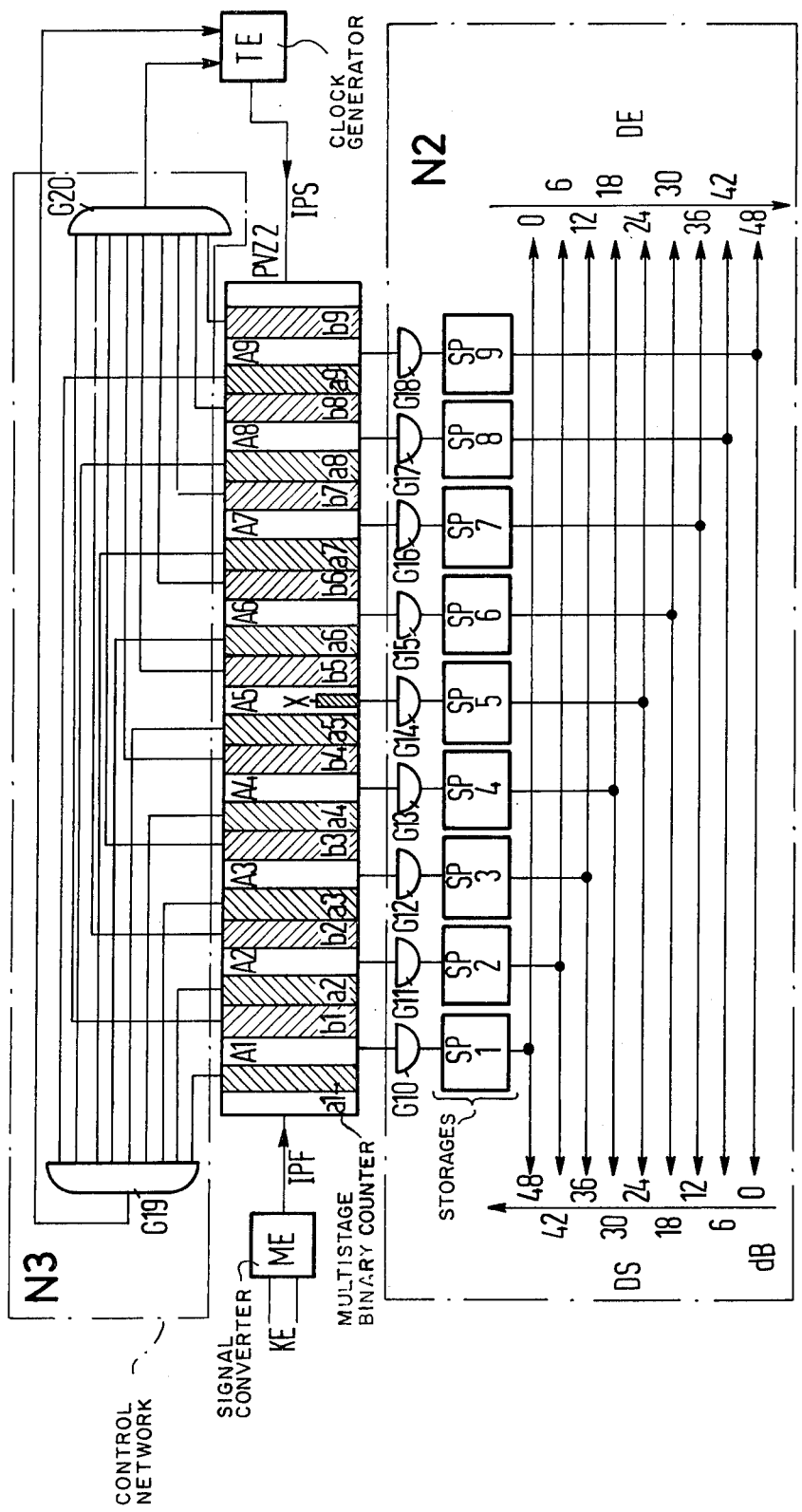
FIG. 2 is a detailed schematic diagram of a digital level comparison device constructed according to the invention.

FIG. 2 shows the digital level comparison device and associated switching apparatus constructed according to the invention, comprising essentially a pulse comparison device PVZ2 in the form of a binary counter with the graduations A1 to A9, $a1$ to $a9$, and $b1$ to $b9$. It further comprises a network N2 having gates G10 to G18, storages SP1 to SP9, control leads for the activation of appropriate attenuator stages and one scale each for the attenuators in the receiving channel DE and for attenuators in the transmitting channel DS. There are provided, as well, a clock generator TE and a digital modulating stage ME as shown in FIG. 1, and a control network N3 for the activation of the clock generator TE represented by the extra graduations $a1$ to $a9$ and $b1$ to $b9$.

First, the known principles for the control procedure of attenuator stages using a level comparison device of the type here in question will be explained with reference to FIG. 1. On the right of that figure is shown a clock generator TE which applies clock pulses IPS to the level comparison device. These pulses are the equivalent of a nominal level, to which the volume level applied at the input of the modulating means on the left shall be attenuated. The volume level applied over receiving channel EK is converted logarithmically in the modulating means and applied to the level comparison device PVZ1 in the form of pulses IPF, which are the equivalent of the volume level or the external level.

For the purposes of this description it will be assumed that the individual graduations 0 to 8 in the scale range 0 to 8 of the level comparison device PVZ1 each correspond to an attenuator stage on the order of $p=6$ db. If it is further assumed that in the readout setting x the external level available in the form of IPF pulses is still 10 db larger than the nominal level set in the form of IPS pulses, the readout will run further towards the smaller level, i.e., to the right in FIG. 1. In this way, it moves from interval 2 to interval 3, so that instead of 12 db in the receiving channel and 36 db in the transmitting channel, now 18 db are set in the receiving channel and 30 db in the transmitting channel via the control leads of the network N1. The difference between the external level and the nominal level is now only 4 db, and the counter reading continues to run to the right. If the counter reading crosses the border between the graduations 3 and 4, towards graduation 4, the voice-grade channel attenuation is changed over to 24 db in the receiving channel and to 24 db in the transmitting channel. The nominal level is now 6 db higher than the external level so that, as a result, the counter reading runs from right to left, and when the border between graduations 4 and 3 towards graduation is crossed again, the device switches back to an 18 db receive equivalent and a 30 db send equivalent. At this point, the external level is again 4 db higher than the nominal level, and the counter reading again runs from left to right. Theoretically, this results in a constant hunting between graduations 3 and 4 and between the corresponding attenuator stages. Inasmuch as the volume level converted by the modulation means ME is not constant as a center level and, hence, has a compensating effect, hunting will probably not occur as frequently as would appear at first glance. However, it certainly is not to be avoided.

FIG. 2 shows a circuit arrangement, by means of which with a constant attenuator stage magnitude of 6 db the hunting effect outside the level comparison device is not noticeable, e.g., on the voice channel.

The level comparison device PVZ2 received from the left side, just as in the level comparison device PVZ1 of FIG. 1, pulses IPF which correspond to an external level being measured and, from the right side, pulses IPS, which correspond to a nominal level. The devices ME and TE correspond to the like-named devices shown in FIG. 1.

The level comparison device is not only divided into graduations 0 to 8, but the graduations A1 to A9 corresponding to these graduations have on each side an extra graduation, the ones lying on the left being designated $a1$ to $a9$ and those on the right $b1$ to $b9$.

The outputs from each stage of the level comparison device PVZ2 are connected to gates G10 to G18 and through these gates to storages SP1 to SP9. The outputs from the storages are, respectively, connected to control leads of the network N2 for connecting the attenuator stages in the receive and send channels assigned to the intervals A1 to A9. When the components (e.g., bistable circuits) corresponding to these intervals are in operation, it means that for each interval in the send or receive channel an attenuator stage of $p=6$ db is added to or removed from the circuit. The extra intervals having the index a lead via a gate G19 to the clock generator TE, where they increase the number of pulses IPS. The latter increase corresponds to a level increase of $p=6$ db.

The outputs at the extra graduations having the index $b$ likewise are connected by a gate G20 to the clock generator TE where they reduce the number of pulses IPS. The latter reduction corresponds to a level reduction of $p=6$ db. These control leads going out from the extra stages corresponding to the extra intervals including the gates G19 and G20 are combined into a control network N3.

To explain the switching arrangement, let it again be assumed that in the readout setting x the external level available in the form of IPF pulses is still 10 db higher than the nominal level available in the form of IPS pulses. Since $b$ counter reading x is in the graduation A5 at the time there is this difference in pulse numbers, an attenuation of $DE = 24$ db is inserted in the receive channel and an attenuation of $DS = 24$ db is inserted in the send channel. The counter reading x now runs to the right for the purpose of matching the pulse numbers and initially comes in the extra graduation $b5$. Since the clock generator TE is so controlled by the extra stages corresponding to extra intervals having the index b that the number of pulses IPS generated thereby corresponds to a nominal level increased by 6 db, there now remains an increment of 4 db, by which value the external level is still higher than the increased nominal level now present. Nothing has changed both with regard to the storage adjustment and the channel attenuation adjustment. Since the external level is still higher than the nominal level, the counter reading will drift still further to the right towards the lower pulse number until it reaches the extra interval $a6$. We know that the extra intervals having the index $a$ are so influenced that the pulse number produced thereby corresponds to a normal nominal level reduced by 6 db. In this way, there is a difference of $4+6+6 = 16$ db between the external level and the reduced nominal level presently applied. Thus, the counter reading x drifts further to the right to the interval A6.

From this, it follows that the storage SP6 is activated via the gate G15, and for the receive channel an attenuation $DE = 30$ db is added, while in the send channel the attenuation $DS = 18$ db. Since the nominal level adjustment has again been cleared via the extra interval stage $a6$ and since furthermore, via the stage A6, a true 6 db attenuation has been added (and removed in the send channel), the difference between the external level and the true nominal level is only 4 db. This means for the level comparison device that the external level is still higher than the true nominal level, and the extra interval stage *b6* is activated as a result. Since, when an interval or an extra interval changes its value, the preceding interval or extra interval automatically returns to its original value, it is obvious why single storages must be employed. In this case, the storage SP6, for example, must record the value of the interval A6, i.e., until it is reset by another storage, namely, when the latter is activated by its associated interval.

Via the extra interval stage *b6*, the nominal level is again increased by 6 db so that the difference between the external level and the higher nominal level presently applied is −2 db. In this way, the nominal level applied is higher than the external level for the first time and the counter reading *x* will now run in reversed direction (from right to left). However, as soon as it reaches interval A6, there is no need for the higher nominal level brought about by the extra interval and the external level is again 4 db higher than the applied nominal level. The readout will now swing back and forth continually between interval A6 and extra interval *b6*. Since, however, the transistion between interval A6 and extra interval *b6* does not become noticeable either in the storages or in the control network N2 and, thus, does not result in a change in the channel attenuation, this hunting of the counter reading is not audible.

It is apparent from the above that it is possible with the switching arrangement constructed according to the invention to provide a digital level comparison device with suitable means for controlling connections and disconnections of attenuator pads in voice-grade channels, with a view to preventing the control of the voice volume range and at the same time a continuous audible amplification and damping by attenuator stages being added and/or removed.

The principles of the invention are described hereinabove by describing a preferred embodiment constructed accordingly. The described embodiment is to be considered only as being exemplary, and it is contemplated that modifications or changes can be made within the scope of the invention as defined in the appended claims.

I claim:

1. In a digital level comparison device having a binary counter, a switching network responsive thereto for adding and removing attenuation from a signal channel, an input to said binary counter for receiving an output from said signal channel and a clock generator producing clock pulses corresponding to a predetermined nominal signal level coupled to said binary counter, said counter having a plurality of stages, each stage having an output coupled to said switching network for delivering thereto an output signal when the counter registration has advanced to that stage, each said stage corresponding to a predetermined attenuation interval thereby forming a plurality of attenuation interval stages, the improvement comprising:

first and second additional attenuation interval stages forming portions of said attenuation intervals, each attenuation interval corresponding to a said counter stage, and arranged such that advancement of said counter to said first additional interval will cause reduction of said predetermined nominal signal level by a given value and advancement of said counter to said second additional interval will increase said nominal signal level by a given value and means connecting said first and second additional interval stages to said clock generator for altering the output thereof in accordance with the counter registration.

2. The improved digital level comparison device defined in claim 1 wherein said switching network comprises logic gate means having inputs connected to each said stage output and a plurality of storage means having, respectively, an input connected to one of a plurality of outputs from said logic gate means, the outputs of each storage means being connected to control leads which, respectively, provide outputs responsive to which particular attenuation values are added to or removed from a signal channel.

3. The improved digital level comparison device defined in claim 2 further comprising means for erasing the contents of predetermined ones of said storage means when an output signal from a said stage is received by its associated storage means.